US006075294A

United States Patent [19]

Van den Boom et al.

[11] Patent Number: 6,075,294

[45] Date of Patent: Jun. 13, 2000

[54] LOCKING SYSTEM, PARTICULARLY FOR MOTOR VEHICLES

[75] Inventors: Andreas Van den Boom, Essen; Stefan Lange, Velbert, both of Germany

[73] Assignee: Huf Hülsbeck & Fürst GmbH & Co. KG, Velbert, Germany

[21] Appl. No.: 09/171,790

[22] PCT Filed: Apr. 16, 1997

[86] PCT No.: PCT/EP97/01890

§ 371 Date: Oct. 26, 1998

§ 102(e) Date: Oct. 26, 1998

[87] PCT Pub. No.: WO97/41322

PCT Pub. Date: Nov. 6, 1997

[30] Foreign Application Priority Data

Apr. 27, 1996 [EP] European Pat. Off. ............ 196 17 038

[51] Int. Cl.[7] ...................................................... B60R 25/00

[52] U.S. Cl. ......................... 307/10.1; 340/541; 340/562; 340/426

[58] Field of Search ........................... 307/10.1; 340/541, 340/562, 426, 425.5, 539

[56] References Cited

U.S. PATENT DOCUMENTS

| | | | |
|---|---|---|---|
| 3,845,843 | 11/1974 | Cohen . | |
| 4,797,657 | 1/1989 | Vorzimmer et al. | 340/541 |
| 5,315,285 | 5/1994 | Nykerk | 340/426 |
| 5,396,215 | 3/1995 | Hinkle | 307/10.2 |
| 5,682,032 | 10/1997 | Philipp | 235/492 |

FOREIGN PATENT DOCUMENTS

| | | |
|---|---|---|
| 1566733 | 11/1969 | Germany . |
| 3440442 | 5/1986 | Germany . |
| 3621592 | 7/1987 | Germany . |
| 4435894 | 4/1996 | Germany . |

*Primary Examiner*—Albert W. Paladini
*Attorney, Agent, or Firm*—Friedrich Kueffner

[57] ABSTRACT

In a locking system, used for instance on a vehicle, a switch or sensor initiates the interrogation of a data storage medium via a control unit to check for access authorization. If access authorization is given, the control unit releases the locks of the locking system automatically. To improve user convenience regarding the system release, at least one capacitance sensor in at least one door grip is provided. At least one first electrode of the sensor is situated in the inner shell of the door grip and a second electrode is placed in the door area opposite the grip. By applying antipole voltage to both electrodes, an electrical field is generated between the two electrodes. When a hand, which acts as a dielectric, approaches the grip, a change in the cumulative dielectric state between the two electrodes occurs. Such a change is recognized by the capacitance sensor and transformed into an electric pulse which initiates in the electrical control unit interrogation of the data storage medium. The data storage medium then sends its data to the on-board electrical control unit which compares the data received with the data stored and releases the locks of the vehicle doors if the data match.

10 Claims, 2 Drawing Sheets

LOCKING SYSTEM, PARTICULARLY FOR MOTOR VEHICLES

Background of the Invention

1. Field of the Invention

The invention pertains to a locking system for motor vehicles, consisting of a lock to be actuated by a grip on at least one door, tail gate etc. of a vehicle. The lock can be switched between two different positions, namely, a secured position which makes the grip inoperative and another position which allows the grip to operate, in which position the lock is to be opened by actuation of the grip. A sensor, located near the grip and connected to an electrical control unit, initiates the process by which a data storage medium, held by the operator, is interrogated for data by the electrical control unit. The electrical control unit is connected to a send/receiver unit and transmits via this unit the data request to the data storage medium held by the operator. The data storage medium transmits its data from the data unit via a transmitter to the send/receiver unit into the vehicle. The send/receiver unit passes the data along to the electrical control unit. The electrical control unit, in the event of a positive data identification, orders the release of the lock or locks on at least one door, tail gate, etc. of the vehicle. In a locking system of this type, access authorization is checked by a process of electromagnetic data interrogation. The area of application of the invention is intended especially to include motor vehicles, accesses to security zones, etc.

2. Description of the Related Art

In a locking system of the type indicated above, it is known that a person can be given access to, for example, a motor vehicle, by way of the data interrogation of a data storage medium such as a check card. The process of data interrogation is initiated in this case by a mechanical switch or sensor, e.g., a light barrier, attached to the vehicle, this switch being installed on a door handle or at least in the area of a door handle. By actuating the switch, or, expressed more accurately, by a moving the handle or by passage of a hand through the light barrier, the person desiring access initiates the process by which a control unit in the vehicle, for example, requests data from the data storage medium. The pulse thus triggered is sent by the control unit to a transmitter, which transmits the request for data to the data storage medium. The data storage medium receives the data interrogation command and sends it to a data unit, which passes on the requested data to a transmitter. The transmitter then sends the data back to the send/receive unit on the vehicle, and from there it goes to the control unit in the vehicle. If the control unit establishes positive data recognition, it issues a command to release the locking system.

The data interrogation process therefore does not begin until after the handle, such as the stirrup-shaped or flap-shaped grip of a door handle, has been actuated. Because there are still several steps which must follow the actuation of the handle, the interrogation process begins at a relatively late point in time, as can be derived from the above description. This delay in the data interrogation and the time it then takes for the a central locking system to respond make a system of this kind inconvenient. In many cases, the result is that the locking system is not released the first time the handle is actuated, and the person desiring access must actuate the handle a second time to open the door.

A locking system for locking a motor vehicle in which the data interrogation of a transponder is initiated inductively by an induction coil mounted on the vehicle near the handle is known from DE 44 35 894 A1. The person desiring access initiates the data interrogation of the transponder by approaching the vehicle equipped with the induction coil, and the transponder is thus addressed. The transponder then transmits the data stored in it, i.e., an identification code, to a control unit, which checks the access authorization. If the control unit makes a positive recognition of the data, it gives the command to release the locking system.

In the device described above, it is disadvantageous that the locking system can be released unintentionally if, after the locking process, the user unintentionally or accidentally approaches the vehicle again after it has been locked by the safety device described.

A design for unlocking and monitoring a locking system is known from DE AS 15 66 733. In this design, the data storage medium consists of an LED, which is attached to a portable transmitter. A receiver, which is located on the locking device on the door, is connected to an electronic control unit, which evaluates the incoming signal from the portable transmitter. To release the locking system, the user must aim the portable transmitter with the LED at the receiver on the locking device and thus actuate the transmitter. The light signal emitted by the transmitter, which has a characteristic wavelength, is then received by the receiver and transmitted to the control unit, which checks to see whether or not the light frequency emitted by the transmitter is the same as the preset value. If the frequencies match, the control unit releases the locking device.

The disadvantage here is that the user is required to perform awkward actions, in that he must aim the transmitter accurately at the receiver on the locking device. This makes the system inconvenient to operate.

A locking system which consists of an infrared transmitter and several infrared receivers, which are mounted on the vehicle near the outside skin of the vehicle and which control the locking system, is known from DE 36 21 592 C1.

To release the locking system, the user is required in this case, as already explained in the previous case, to aim the portable transmitter with the IR diode at the receiver on the locking system and thus to actuate the transmitter. The IR beam emitted by the transmitter is then analyzed by the receiver, which checks to see whether or not the light frequency emitted by the transmitter is the same as the preset value. If the frequencies match, the control unit releases the locking device.

The disadvantage is present here, too, that the user himself must perform awkward actions, in that he must aim the transmitter accurately at the receiver on the locking system, which makes the system inconvenient to use.

A built-in push-button unit for vehicle doors is also known from DE 34 40 442 A11. This switch has two push-button elements, which can be used to actuate a microswitch.

SUMMARY OF THE INVENTION

The task of the invention is to develop a system of the aforementioned kind which makes it possible for the user to gain access to a motor vehicle in a convenient and safe manner. This is accomplished in accordance with the invention by the following features: the sensor is a capacitance sensor having at least a first electrode sensor that is integrated into the grip, whereas a second electrode of the capacitance sensor is mounted near the grip on the door as a structural component of the sheet metal construction of the door, so that an electrical field is generated between the electrodes. The capacitance between the two electrodes can be changed by the dielectric of a human hand entering the area of the electrical field and can thus be detected.

The inventive feature is that at least one electrode is installed in the part of the handle gripped by the hand and that a counterelectrode is installed in the part of the door opposite the grip. The door itself can be this counterelectrode. Once an electrical field has been generated between the two electrodes, it can be used in an advantageous manner to detect the desire of a person to gain access to the vehicle as the person reaches toward the handle. This is done in accordance with the invention in that the hand of the person reaching toward the handle on the door brings about a change in the capacitance built up between the two electrodes. It is the special function of the hand to change the nature of the dielectric between the electrode on the grip and the counterelectrode on the door, in that some of the surrounding air is replaced by the dielectric of the hand, and thus in sum a different total dielectric value is produced. It is advantageous for the entire process, starting with the detection of the approach of the hand, continuing with the reception of the data transmitted by the data storage medium, and ending with the release of the locking system upon successful recognition of access authorization, to be completed reliably even before the handle is in fact actuated.

An electronic circuit, which detects the change in capacitance and translates this into a command pulse, is preferably installed in the grip part of the handle to save space. The command pulse generated by this electronic circuit initiates the interrogation of the data storage medium in the electrical control unit.

It is also of benefit to use an additional electrode, which has the task of supplying the system with data for compensating for the differences in capacitance caused by changes in outside boundary conditions, such as differences caused by changes in the weather.

BRIEF DESCRIPTION OF THE DRAWINGS

Further measures and advantages of the invention can be derived from the dependent claims the following description, and the drawings. The drawings illustrate the invention on the basis of an exemplary embodiment:

DESCRIPTION OF THE PREFERRED EMBODIMENTS

Figure 1:
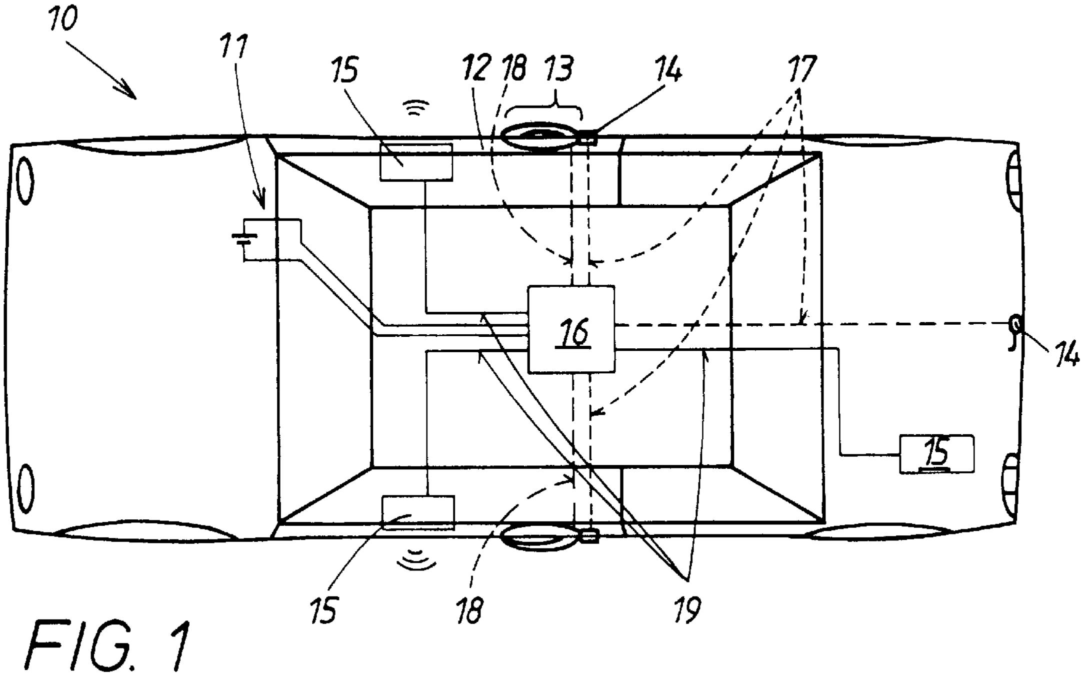
FIG. 1 shows a schematic diagram of a vehicle with an integrated locking system.
Figure 2:
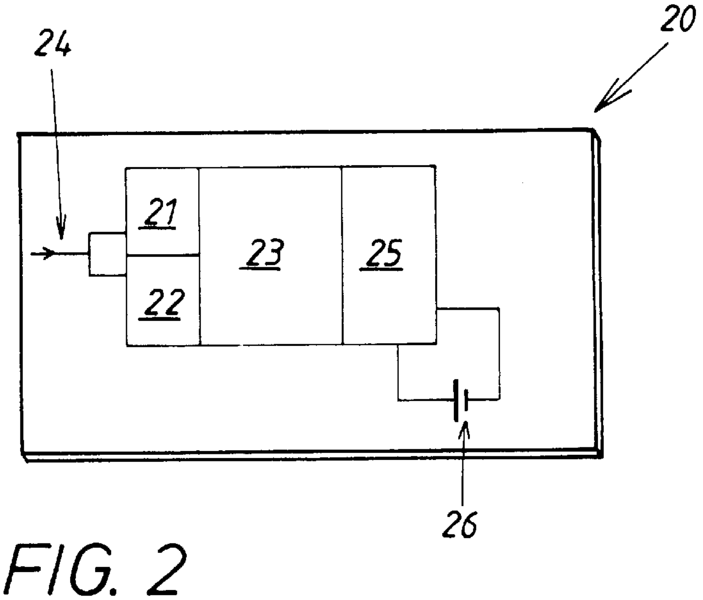
FIG. 2 shows a schematic diagram of a data storage medium, as embodied in the form of a check card.

As can be seen from FIGS. 1–4, the invention pertains to a locking system, which consists of several components 13–37, and which, in the exemplary embodiment illustrated here, is integrated into a vehicle 10. This locking system is intended to give the authorized user of vehicle 10 access to vehicle 10 in the easiest and most convenient way. It can be seen from FIG. 1 that, in this exemplary embodiment, a door handle 13 and a lock 14 are attached to each of two doors 12. Handle 13 includes a gripping part 27, such as stirrup or flap, which contains a capacitance sensor 30–34. From door handles 13, conductors 18 pass from capacitance sensors 30–34 to an electrical control unit 16. When a hand approaches the space between handle 13 and door 12, a signal is sent via these conductors 18 from capacitance sensors 30–34 to electrical control unit 16. In electrical control unit 16, a signal of this type initiates a process by which a data storage medium 20 (FIG. 2), held by the operator, is interrogated for data; this request for data is transmitted by electrical control unit 16 via conductors 19 to several send/receive units 15, which transmit the data request electromagnetically to data storage medium 20 shown in FIG. 2.

In data storage medium 20, the command to transmit data is received by an antenna 24 and passed on to a receiver 22 of data storage medium 20. Receiver 22 passes the signal along to data unit 23 of data storage medium 20, which transmits the requested data via a transmitter 21 and antenna 24 of data storage medium 20 back to send/receive units 15 in vehicle 10. In this exemplary embodiment, data storage medium 20 comprises, in addition to the components cited above, a power supply 26 and an electronic circuit 25, which helps control the functions of data storage medium 20.

Send/receive units 15 send the received data via conductors 19 to electrical control unit 16. In electrical control unit 16, the data supplied by data storage medium 20 are compared with the identification data stored in electrical control unit 16. In the case of a positive data recognition (recognition of proper access authorization), electrical control unit 16 sends a signal via conductors 17 to locks 14 to release them, switching grips 27 from their inactive mode to their active mode. When grips 27 are in this active mode, it is possible for locks 14 to be opened by actuation of the grip.

In this exemplary embodiment, the power required to operate the locking system, electrical control unit 16, and the other active electrical components is drawn from automobile battery 11.

Figure 4:
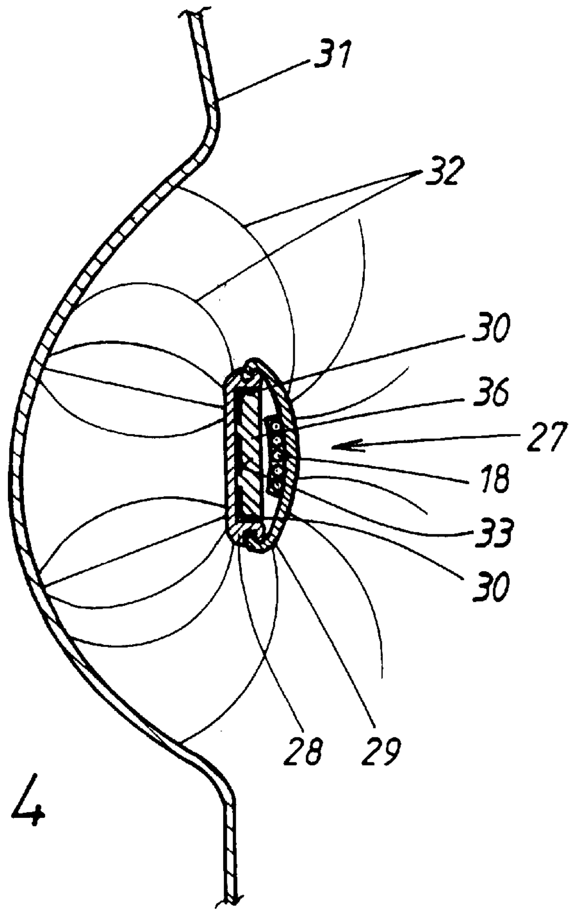
FIG. 4 shows a handle and part of a door in cross section.
Figure 3:
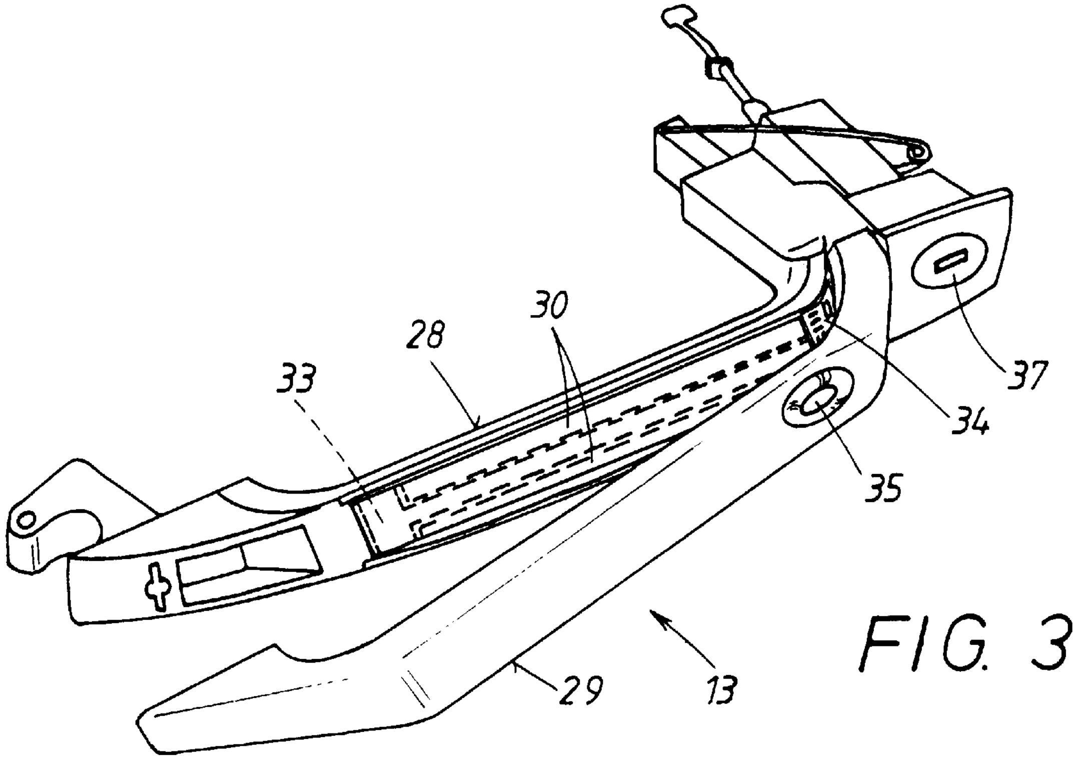
FIG. 3 shows a perspective view of a door handle.

In this exemplary embodiment, a first electrode 30 of capacitance sensor 30–34 is divided into two parts, as can be seen from FIGS. 3 and 4. These two parts are arranged symmetrically in an inner shell 28 of grip 27. The transverse profiles of the two parts of first electrode 30 have an L-shape, as can be seen from the cross section of grip 27 in FIG. 4. In the center, between the two parts of electrode 30, a compensating electrode 33 is provided. In this exemplary embodiment, electronic circuit 34 of capacitance sensor 30–34 is installed in inner shell 28 in the part of grip 27 facing lock cylinder 37. Electrodes 30, 33 and electronic circuit 34 are coated with a layer of insulating material 36 to seal them off from the air.

It can be seen from FIG. 3 that a push button-switch 35 is located in outer shell 29 of grip 27. In the present exemplary embodiment, this switch can be actuated to lock locking system 13–37.

In this exemplary embodiment, conductor 18 passes along outer shell 29, as can be seen from FIG. 4. In addition, the approximate extent of an electrical electrical field 32 between first electrode 30 and a second electrode 31, which, in this exemplary embodiment, corresponds to door 12 of vehicle 10, is also illustrated in FIG. 4.

If the power fails, doors 12 can still be opened by the use of a key, provided for use in such situations, in lock cylinder 37.

It remains to noted that the embodiment presented here is only one exemplary embodiment of the invention. The invention is not limited to it. For example, the push-button switch could be replaced by a second sensor mounted in the outer shell of grip 27. This sensor would detect the passage of a hand in front of the side of grip 27 facing away from vehicle 10 and thus register the desire of a person to lock the vehicle. Nor are the electrodes limited to a certain form either; on the contrary, they can be designed in any way which is suitable for the electrode in question. Finally, there is no specific number of sensors which must be used.

List of Reference Numbers

10 vehicle
11 automobile battery
12 door
13 door handle
14 lock
15 send/receive unit
16 electrical control unit
17 conductor (from electrical control unit to lock cylinder)
18 conductor (from electrical control unit to capacitance sensor)
19 conductor (from electrical control unit to send/receive unit)
20 data storage medium
21 transmitter (of the data storage medium)
22 receiver (of the data storage medium)
23 data unit (of the data storage medium)
24 antenna (of the data storage medium)
25 electronic circuit (of the data storage medium)
26 power supply (of the data storage medium)
27 grip
28 inner shell (of the grip)
29 outer shell (of the grip)
30 first electrode
31 second electrode
32 electrical field
33 compensating electrode
34 electronic circuit (of the capacitance sensor)
35 push-button switch
36 insulating layer
37 lock cylinder

We claim:

1. Locking system especially for motor vehicles, consisting of a lock (14), to be actuated by a grip (27) on at least one door (12), or tail gate, where the lock (14) can be switched between two different positions, namely, a secured position which makes the grip (27) inoperative and another position which allows the grip (27) to operate, in which position the lock (14) is to opened by actuation of the grip (27), and in which a sensor (30–34), located near the grip (27) and connected to an electrical control unit (16), initiates the process by which a data storage medium (20), held by the operator, is interrogated for data by the electrical control unit (16);

where the electrical control unit (16) is connected to a send/receiver unit (15) and transmits via this unit the data request to the data storage medium (20) held by the operator, and the data storage medium (20) transmits its data from a data unit (23) via a transmitter (21) to the send/receiver unit (15) in the vehicle, and the send/receiver unit (15) passes the data along to the electrical control unit (16), and the electrical control unit (16), in the event of a positive data identification, orders the release of the lock or locks on at least one door (12), or tail gate of the vehicle (10), wherein the sensor (30–34) is designed as a capacitance sensor; in that at least a first electrode (30) of the capacitance sensor (30–34) is integrated into the grip (27), whereas a second electrode (31) of the capacitance sensor (30–34) is mounted near the grip (27) on the door as a structural component of the sheet metal construction of the door, so that an electrical field (32) is generated between the electrodes; and in that the capacitance between the two electrodes (30,31) can be changed by the dielectric of a human hand entering the area of the electrical field (32) and thus detected.

2. Locking system according to claim 1, wherein the electronic circuit (34) of the capacitance sensor (30–34) is integrated into the grip (27).

3. Locking system according to claim 1, wherein the grip (27) has another electrode, which functions as a compensating electrode (33).

4. Locking system according to one of claims 1–3, characterized in that the first electrode (30) is divided into two electrode parts.

5. Locking system according to claim 1, wherein the first electrode (30) is mounted symmetrically in an inner shell (28) of the grip (27).

6. Locking system according to claim 1, wherein the two electrode parts of the first electrode (30) extend along the long edges of the inner shell (28) of the grip (27).

7. Locking system according to claim 1, wherein the compensating electrode (33) is mounted between the two electrode parts of the first electrode (30).

8. Locking system according to claim 1, wherein an additional sensor for locking the locking system is built into the grip (27).

9. Locking system according to claim 1, wherein an additional electrode in the grip (27) is assigned to the additional sensor.

10. Locking system according to claim 1, wherein the locking of the locking system is initiated by the use of a mechanical push-button switch (35).

* * * * *

UNITED STATES PATENT AND TRADEMARK OFFICE

CERTIFICATE OF CORRECTION

PATENT NO. : 6,075,294
DATED : June 13, 2000
INVENTOR(S) : Andreas Van den Boom, et al It is certified that error appears in the above-identified patent and that said Letters Patent is hereby corrected as shown below:

[30] Foreign Application Priority Data

Apr. 27, 1996 [DE] Germany............196 17 038

Signed and Sealed this

Fourteenth Day of August, 2001

*Attest:*

Nicholas P. Godici

NICHOLAS P. GODICI

*Attesting Officer* *Acting Director of the United States Patent and Trademark Office*